United States Patent [19]

Tevanian et al.

[11] Patent Number: 5,432,937
[45] Date of Patent: Jul. 11, 1995

[54] METHOD AND APPARATUS FOR ARCHITECTURE INDEPENDENT EXECUTABLE FILES

[75] Inventors: Avadis Tevanian, Palo Alto; Michael DeMoney, San Jose; Kevin Enderby; Douglas Wiebe, both of Redwood City, all of Calif.; Garth Snyder, Boulder, Colo.

[73] Assignee: NeXT Computer, Inc., Redwood City, Calif.

[21] Appl. No.: 110,156

[22] Filed: Aug. 20, 1993

[51] Int. Cl.6 .......................... G06F 9/44; G06F 9/22
[52] U.S. Cl. ............... 395/700; 364/DIG. 1; 364/DIG. 2
[58] Field of Search ............... 395/700; 364/DIG. 1, 364/DIG. 2

[56] References Cited

U.S. PATENT DOCUMENTS

| | | | |
|---|---|---|---|
| 4,667,290 | 5/1987 | Goss et al. | 364/300 |
| 4,691,278 | 9/1987 | Iwata | 364/200 |
| 4,814,975 | 3/1989 | Hirosawa et al. | 364/200 |
| 5,053,945 | 10/1991 | Whisler et al. | 364/200 |
| 5,119,465 | 6/1992 | Jack et al. | 395/500 |

*Primary Examiner*—Kevin A. Kriess
*Assistant Examiner*—Majid A. Banankhah
*Attorney, Agent, or Firm*—Hecker & Harriman

[57] ABSTRACT

The present invention is a method that enables single release of applications for multiple architectures and operating systems and to provide ease of use of applications in multiple architecture environments. The present invention provides a single file that contains separate object code each of multiple architectures. A special header on the file identifies each section of object code and includes pointers to its starting location. When the file is to be executed on a particular architecture, the resident operating system identifies that block of object code most suited for that particular architecture and environment. That section of code is then loaded into memory for execution. Each architecture in the file is specified by CPU-type and CPU sub-type. For each CPU type or CPU sub-type, file offset, file size and alignment is also provided. Padded bytes are provided to place each member on its specific alignment. These padded bytes are undefined and can be left as "holes" if the file system cannot support them. The appropriate architecture can be picked at compile time and compilers that can run on any architecture are provided to perform the translation.

11 Claims, 3 Drawing Sheets

  
FIG. 1A    FIG. 1B    FIG. 1C
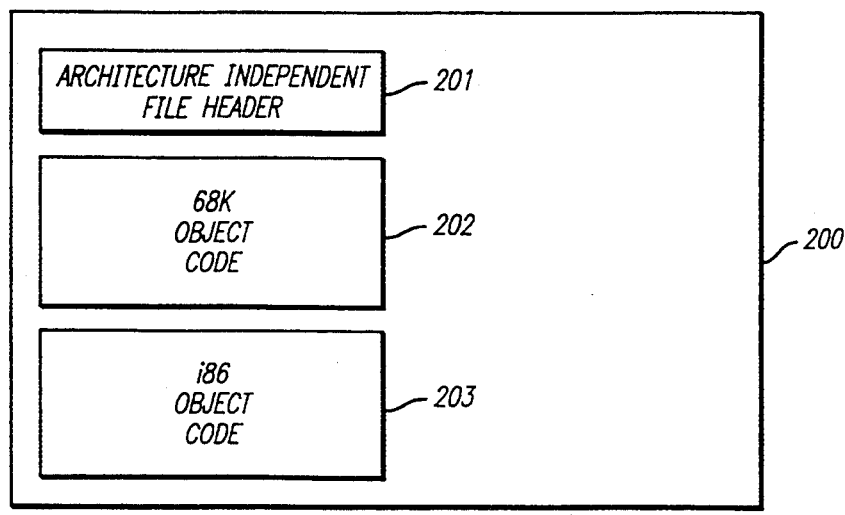
FIG. 2
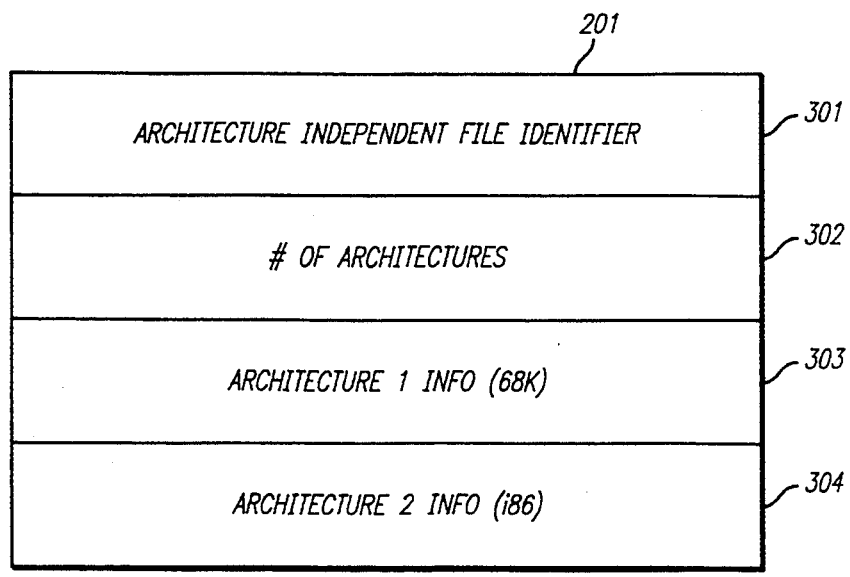
FIG. 3

METHOD AND APPARATUS FOR ARCHITECTURE INDEPENDENT EXECUTABLE FILES

BACKGROUND OF THE PRESENT INVENTION

1. Field of the Invention

This invention relates to the field of generating and executing applications for computer systems.

2. Background Art

Computer systems utilize one or more microprocessors as the central processing unit (CPU) to execute instructions and control operations of the computer system. The microprocessor receives data and instructions from an associated main memory and performs operations based on those data and instructions. There are a number of microprocessors that are used as the central processing unit of a computer system. The terms "computer architecture", "environment", "hardware", and "platform" of a computer system refer to the microprocessor type used in the computer system.

One class of microprocessors, manufactured by Motorola, are referred to as "68K" type microprocessors. This class of microprocessor includes such microprocessors as the 68000, 68020, 68030, and 68040 microprocessors. Another type of microprocessor is manufactured by Intel, AMD, and others, and is known as "i86" type microprocessors. These include the 286, 386, 486, pentium, etc. Other processors, known as reduced instruction set microprocessors ("RISC" microprocessors), are also used in computer systems.

Computer systems execute instructions provided by application programs. An application program is a collection of instructions that, when executed, perform tasks and provide functionality to a computer system. An example of an application program is a word processing program. A word processing program is used to create and edit documents and files.

Presently, application programs such as word processing programs, spreadsheets, databases, etc., must be generated with a specific microprocessor or architecture in mind. Providing a spreadsheet program that operates on the above-mentioned three microprocessor types requires that at least three versions of the spreadsheet program be generated: one for 68K architectures; one for i86 architectures; and one for RISC architectures.

In addition, within each family of microprocessors, individually tailored code may be required. For example, i86 microprocessors include "SX" types that do not have math coprocessors, and "DX" types that do include math coprocessors. An application program may be optimized for one type of microprocessors and may be incompatible with the other.

Although the object code of an application program varies with each architecture (and CPU type within an microprocessor family), often the application programs are derived from the same source code. Source code is written in a high level language that is translated by a compiler or interpreter into machine code for operation on a computer. A compiler is a program that converts a program written in a high-level language into either machine code or assembly language, holding the instructions in memory without executing them. The compiled program is then transferred to storage disks for execution at a later time. For example, application programs are often compiled and stored on "floppy" disks or CD-ROM disks for distribution.

Referring to FIGS. 1A–1C, three versions of an application program are illustrated. In FIG. 1A, an executable application program is illustrated as comprising object code 101. The object code 101 is derived from source code that has been translated by a compiler into object code executable on an i86 computer system. FIG. 1B illustrates an application program for execution on a 68K-type computer system. FIG. 1C illustrates source code that has been compiled into object code for RISC-type computer systems. Each of the files in FIGS. 1A–1C is a separate file and requires its own directory listing when loaded onto a computer system.

A disadvantage of writing application programs for a plurality of architectures is the requirement that the application programs be distributed individually. That is, the application program for each architecture is considered to be a separate product and a separate disk must be provided for each. When purchasing the application program, the purchaser must review the product and select the version that is appropriate for the purchasers computer system. For example, if the purchaser has a computer system based on the 386SX microprocessor, the purchaser must select a version of the application program that is designed for that architecture.

Another disadvantage occurs when an application program is shared on a network comprised of computers of different architectures. If computers of three different architecture types are connected to the network, at least three different versions of the application program must be stored on the network. In addition, each user must select the appropriate version of the application for use.

One prior art attempt to provide a method for providing a single application for a variety of architectures and formats is the ANDF system, developed by OSF. This is an architecture neutral binary format. A disadvantage of this scheme is that it requires conversion to the native architecture at installation time.

SUMMARY OF THE INVENTION

The present invention is a method that enables single release of applications for multiple architectures and operating systems and to provide ease of use of applications in multiple architecture environments. The present invention provides a single file that contains separate object code each of multiple architectures. A special header on the file identifies each section of object code and includes pointers to its starting location. When the file is to be executed on a particular architecture, the resident operating system identifies that block of object code most suited for that particular architecture and environment. That section of code is then loaded into memory for execution. Each architecture in the file is specified by CPU-type and CPU sub-type. For each CPU type or CPU sub-type, file offset, file size and alignment is also provided. Padded bytes are provided to place each member on its specific alignment. These padded bytes are undefined and can be left as "holes" if the file system cannot support them. The appropriate architecture can be picked at compile time and compilers that can run on any architecture are provided to perform the translation.

BRIEF DESCRIPTION OF THE DRAWINGS

FIGS. 1A–1C illustrate applications programs of three different architectures.

FIG. 2 illustrates the system independent application program of the present invention.

FIG. 3 illustrates the file header of the application program of FIG. 2.

DETAILED DESCRIPTION OF THE INVENTION

Figure 4:
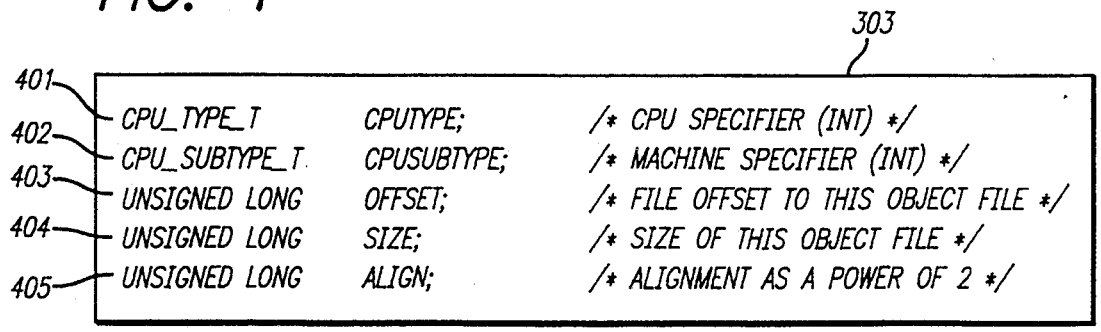
FIG. 4 illustrates the architecture information blocks of FIG. 3 in detail.

A method for providing architecture independent executable files is described. In the following description, numerous specific details, such as processor type, file size, etc., are set forth in detail in order to provide a more thorough description of the present invention. It will be apparent, however, to one skilled in the art, that the present invention can be practiced without these specific details. In other instances, well known features have not been described in detail so as not to obscure the present invention.

The present invention provides a single file that includes executable object code for a plurality of environments and processors. Such a file is referred to as a "architecture independent" file in the present invention, because it includes blocks of object code for more than one architecture. A header provides identifying information for each block of object code. This identifying information includes the architecture (CPU type or CPU sub-type), an offset to the starting address, file size, and file alignment.

When an architecture independent file is opened, the computer system opening the file (requester) reads the header to determine which CPU types and CPU sub-types are available. The requester then selects which object code block is "best" suited for the requester architecture. Using the header information for that block of object code, the appropriate object code is loaded for use by the requester.

Architecture Independent File Format

Referring to FIG. 2, a block diagram of an architecture independent file utilizing the present invention is illustrated. A single file 200 is provided that includes a header 201, object code 202 for a 68K environment and object code 203 for an i86 environment. The header 201 is referred to as an architecture independent file header and includes identifying information as well as pointers and offsets to the blocks of object code for the various environments supported by the architecture independent file.

Architecture Independent File Header

The architecture independent file header 201 is illustrated in more detail in FIG. 3. The architecture independent file header 201 includes an architecture independent file identifier 301, the number of architectures 302, as well as architecture information for the supported environments. This is illustrated by architecture 1 information 303 for the 68K environment, and architecture 2 information 304 for the i86 environment.

The architecture independent file identifier 301 is used to identify a file as an architecture independent file that includes executable code for more than one architecture or environment. In the preferred embodiment of the present invention, the architecture independent file identifier is a hexadecimal version of the word "cafebabe". However, any suitable identifier can be used without departing from the scope and spirit of the present invention. The purpose of the identifier 301 is to identify the file as an architecture independent file. The number of architectures 302 identifies the number of object code blocks included in the architecture independent file. In the example given, the number of architectures is two: one for the 68K environment; and one for the i86 environment. Although referred to as "number of architectures", the number is not restricted to only identifying the number of architectures. An architecture independent file may have object code blocks of a single architecture, but of a plurality of CPU sub-types within that architecture. The number of architectures 302 identifies the total number of object code blocks contained in the architecture independent file. The architecture information blocks 303 and 304 include information specific to its associated block of object code.

Architecture Information Blocks

FIG. 4 illustrates the architecture information blocks 303 and 304 of FIG. 3 in detail. The architecture information includes CPU type 401, CPU sub-type 402, offset 403, size 404 and alignment 405. The CPU type 401 identifies the architecture CPU type, such as 68K or i86. This is an integer value in the preferred embodiment of the present invention. The CPU sub-type 402 identifies the particular version of the CPU type, for example, a 286, 386 or 486 sub-type of an i86 CPU type, or a 68020, 68030 or 68040 sub-type of a 68K CPU type. The offset 403 is the offset to the object code block in the architecture independent file. The size 404 is the size of the object code file and the align 405 is the alignment of the file as a power of two. This is for architectures that operate on pages of memory at a time, so that the pages can be defined appropriately for the system.

The CPU sub-type allows further optimization of the architecture independent file for specific architectures and environments. For example, some processors perform floating point operations in hardware, while others do it in software. In the prior art, the application may be written as a compromise so that it can utilize the hardware floating point operations, if available, but otherwise it implements traps and emulates the floating point operations in software. For example, the 486SX microprocessor does not perform floating point operations in hardware, while the 486DX microprocessor does perform floating point operations in hardware. Performance of certain applications, such as spread sheets, can be compromised when code is written to be optimized on only one type of processor.

Using the present invention and taking advantage of the CPU sub-type designation, separate object code is provided for the 486DX microprocessor sub-type that takes advantage of the floating point operations in hardware. Separate object code is also provided for the 486SX microprocessor that performs floating point operations in software. In the 486SX microprocessor version, the software avoids using traps and emulations and goes directly to the calls for performing floating point operations. This improves efficiency of execution of the application.

Opening an Architecture Independent File

Figure 5:
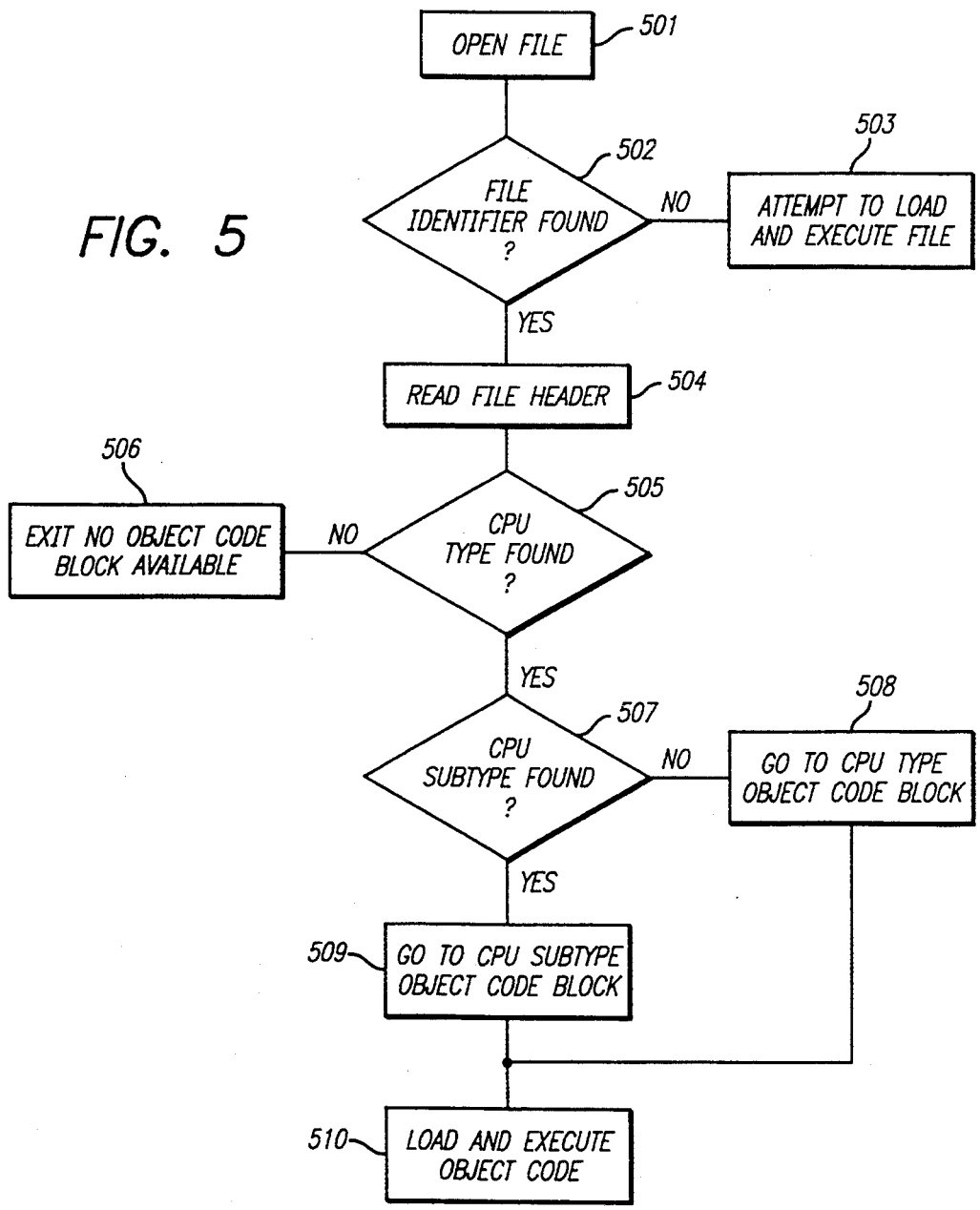
FIG. 5 is a flow diagram illustrating the operation of the present invention.

To take advantage of the capabilities of architecture independent files, operating systems on architectures using architecture independent files must be capable of reading an architecture independent file header, and walking through it to locate and load the appropriate object code block for the requesting architecture. A flow diagram illustrating the opening of an architecture independent file is illustrated in FIG. 5.

At step 501, the file is opened. At decision block 502, the argument "architecture independent file identifier found?" is made. This step determines if the file being opened is an architecture independent file. This is indicated by the presence of "cafebabe" in hex in the preferred embodiment, or any other suitable identifier. If the argument at decision block 502 is false, the system proceeds to step 503. This occurs when the file being opened is not an architecture independent file. At step 503 the system attempts to load and execute the object code of the selected file.

If the argument at decision block 502 is true, meaning an architecture independent file is being opened, the system proceeds to step 504. At step 504 the system reads the architecture independent file header. At decision block 505 the argument "CPU type found?" is made. If the argument is false, the system proceeds to step 506 and exits because an appropriate object code block is not available in the architecture independent file.

If the argument at decision block 505 is true, the system proceeds to decision block 507. At decision block 506 the argument "CPU sub-type found?" is made. This is to determine if there is object code for a specific model of the general microprocessor family. For example, whether there is object code specifically for a 586 microprocessor as opposed to object code for all i86 type microprocessors. If the argument at decision block 506 is false, no CPU sub-types are available and the system proceeds to step 507. At step 507, the system determines the location, size and alignment of the object code block of the CPU type, using the header information provided.

If the argument at decision block 506 is true, a CPU sub-type is found and the system proceeds to step 508. At step 508, the system locates the object code block for the CPU sub-type using the architecture independent file header information. After step 507 or 508, the system loads and executes the located object code block at step 509.

Network Environment

Figure 6:
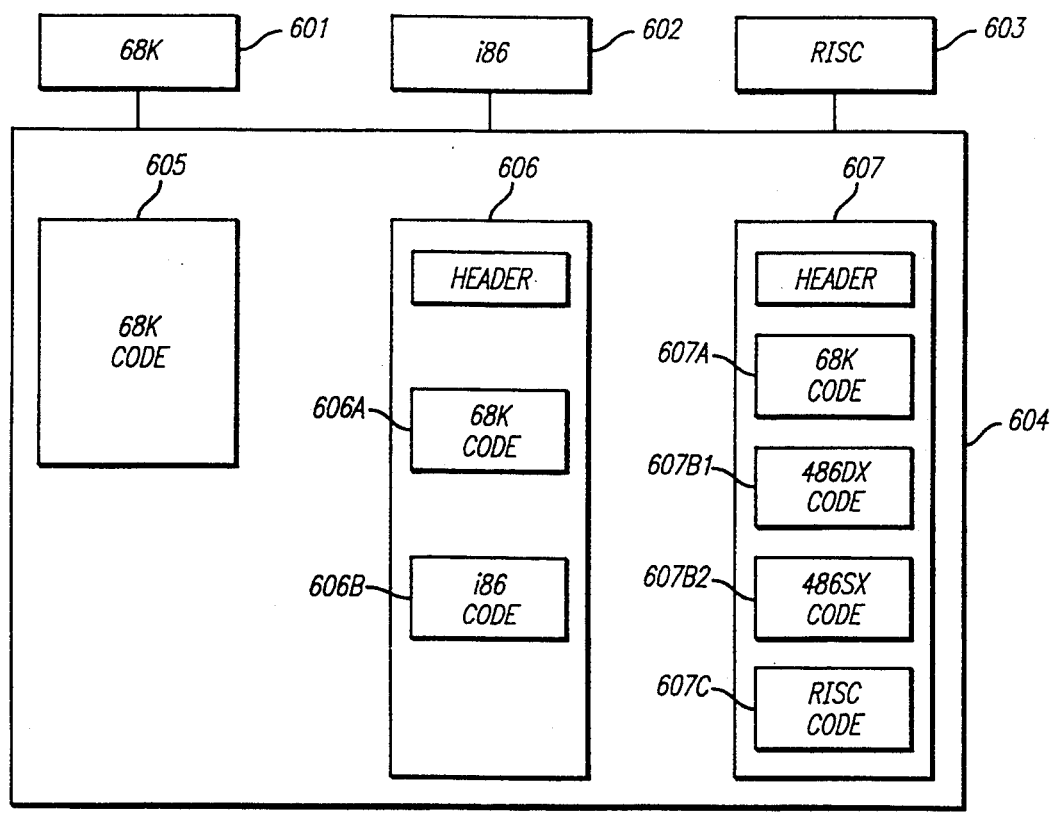
FIG. 6 is an example of a computer network environment utilizing the present invention.

FIG. 6 illustrates a network environment with a 68K type computer 601 (68040 microprocessor), an i86 type computer 602 (486DX microprocessor), and a RISC computer 603. The computers access a shared memory region 604 that includes a number of executable files 605–607.

Consider the example where computer 601 (the 68040 computer) opens file 606. The operating system of the computer 601 first looks for the architecture independent file identifier to determine if the file is an architecture independent file (step 502 of FIG. 5). In this example, the file is an architecture independent file. Computer 601 then reads the architecture independent file header (step 504 of FIG. 5) determines if object code of the appropriate CPU type is available (step 505 of FIG. 5). File 606 does have a block 606A of object code that can be used by 68K type architectures (as well as a block of object code 606B that can be used by i86 type architectures). Computer 601 then determines (step 506 of FIG. 5) if there is object code for the CPU sub-type (68040 microprocessor). In this case there is no separate object code in file 606 for the 68040 CPU sub-type of architecture. Computer 601 retrieves the object code for the 68K architecture, loads it and executes it (steps 507 and 509 of FIG. 5).

Consider now the example where computer 602 (486DX architecture) opens file 607. The file is identified as an architecture independent file. The file contains object code 607A to be used on i86 architectures. In addition, there is object code 607B1 and 607B2 for two CPU sub-types, namely 486DX and 486SX, respectively, and object code 607C for RISC type architectures. Computer 602, following steps 505, 506, 508, and 509 of FIG. 5, downloads the object code 607B1 for 486DX architecture. The use of CPU sub-types in the present invention permits optimized object code to be provided.

In another example, the RISC computer 603 attempts to open file 605. Computer 603 first determines if file 605 is an architecture independent file (step 502 of FIG. 5). In this example the file is not an architecture independent file. Computer 603 then attempts to load and execute file 605 (step 503 of FIG. 5). File 605 is a prior art type 68K file, and cannot be opened by the RISC computer 603.

Consider now where the RISC computer 603 attempts to open file 606. File 606 is identified as an architecture independent file and the header is read by computer 603 (steps 502 and 504 of FIG. 5). However, there is no object code block available for RISC architecture (step 505 of FIG. 5). Computer 603 ends the attempt because there is no available object code (step 506 of FIG. 5). The following table summarizes the result of an attempt by each of computers 601–603 to open files 605–607.

|  | File 605 | File 606 | File 607 |
| --- | --- | --- | --- |
| Computer 601 | Opens File. | Opens 68K object code block 606A. | Opens 68K object code block 607A. |
| Computer 602 | Cannot open file. | Opens i86 object code block 606B. | Opens 486DX object code block 607B1. |
| Computer 603 | Cannot open file. | Cannot open file, no RISC object code. | Opens file with object code block 607C. |

Creating Architecture Independent Files

Architecture independent files are created by compiling high level source code into appropriate object code. The present invention provides compilers that can execute on any architecture. In the prior art, to compile high level source code to an i86 environment, a compiler is executed on an i86 machine. Similarly, to compile a high level source code to a 68K environment, execution of a compiler on a 68K machine is performed. In the present invention, the compilers for different architectures are ported to a single architecture, so that all versions of an object code can be easily generated and combined into a single architecture independent file, regardless of the architecture.

Alternatively, the compiling steps can be performed on different architectures and the resulting object code combined into a single file. The present invention makes it possible to compile on any architecture for any target architecture. It also allows a developer to write in a high level portable language.

Considerations when using compilers for one architecture on a different host architecture are byte order and alignment. For example, i86 machines form bytes from low to big. 68K environments define bytes from big to low. The order of bytes must be kept track of and monitored so that when a 68K compiler is operating on an i86 environment, byte order is accomplished correctly. Alignment is a consideration where RISC machines are involved. RISC machines have alignment constraints as to where in memory data or integers can be placed. In RISC machines, the information must be stored on boundaries that are multiples of byte length. In the present invention, for RISC compilers executed on different architectures, it is assumed that alignment is required and data is placed in appropriate locations.

Using the present invention, software can be distributed on a single disk that contains all versions of the object code. When the software is loaded onto the permanent storage of a computer, only the appropriate object code is downloaded. This can reduce the packaging and preparation costs of software distribution. In addition, confusion is avoided when purchasing software because the consumer does not have to review each package of software to make sure that it is compatible with the purchaser's particular computer system.

The storage of executable files in multiple architecture network environments is made easier using the present invention. A single architecture independent file at a single location is provided for access by all architecture types and sub-types on the multiple architecture network. Users need only select the architecture independent file, and the correct object code block for the requesting architecture is provided for execution.

The present invention is not necessarily limited to applications programs. The invention has equal application to any architecture-specific data or executable files. For example, on some computers, architecture-specific data structures are provided for font tables. The present invention can be used to provide various formats of the data structures where the appropriate file is used at load time to generate data structures.

Computer System

Figure 7:
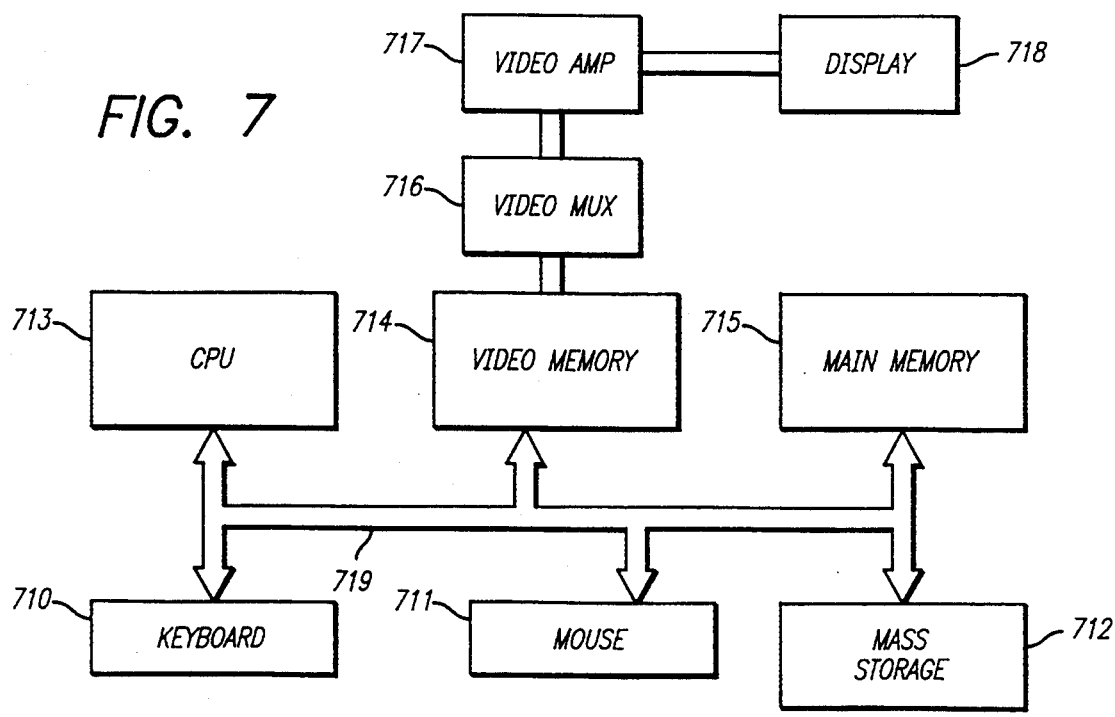
FIG. 7 illustrates an example of a computer system for executing the present invention.

The present invention may be implemented on any conventional or general purpose computer system. An example of one embodiment of a computer system for implementing this invention is illustrated in FIG. 7. A keyboard 710 and mouse 711 are coupled to a bi-directional system 719. The keyboard and mouse are for introducing user input to the computer system and communicating that user input to CPU 713. The computer system of FIG. 4 also includes a video memory 714, main memory 715 and mass storage 712, all coupled to bi-directional system bus 719 along with keyboard 710, mouse 711 and CPU 713. The mass storage 712 may include both fixed and removable media, such as magnetic, optical or magnetic optical storage systems or any other available mass storage technology. The mass storage may be shared on a network, or it may be dedicated mass storage. Bus 719 may contain, for example, 32 address lines for addressing video memory 714 or main memory 715. The system bus 719 also includes, for example, a 32-bit data bus for transferring data between and among the components, such as CPU 713, main memory 715, video memory 714 and mass storage 712. Alternatively, multiplex data/address lines may be used instead of separate data and address lines.

In the preferred embodiment of this invention, the CPU 713 is a 32-bit microprocessor manufactured by Motorola, such as the 68030 or 68040. However, any other suitable microprocessor or microcomputer may be utilized. The Motorola microprocessor and its instruction set, bus structure and control lines are described in MC68030 User's Manual, and MC68040 User's Manual, published by Motorola Inc. of Phoenix, Ariz. However, the microprocessor may also be an i86 microprocessor such as manufactured by Intel Corporation of Santa Clara, Calif., or by Advanced Micro Devices of Sunnyvale, Calif., or the microprocessor may be a RISC type microprocessor.

Main memory 715 is comprised of dynamic random access memory (DRAM) and in the preferred embodiment of this invention, comprises 8 megabytes of memory. More or less memory may be used without departing from the scope of this invention. Video memory 714 is a dual-ported video random access memory, and this invention consists, for example, of 256 kbytes of memory. However, more or less video memory may be provided as well.

One port of the video memory 714 is coupled to video multiplexer and shifter 716, which in turn is coupled to video amplifier 717. The video amplifier 717 is used to drive the cathode ray tube (CRT) raster monitor 718. Video multiplexing shifter circuitry 716 and video amplifier 717 are well known in the art and may be implemented by any suitable means. This circuitry converts pixel data stored in video memory 714 to a raster signal suitable for use by monitor 718. Monitor 718 is a type of monitor suitable for displaying graphic images, and in the preferred embodiment of this invention, has a resolution of approximately 1020×832. Other resolution monitors may be utilized in this invention.

The computer system described above is for purposes of example only. The present invention may be implemented in any type of computer system or programming or processing environment.

Thus, a method of providing architecture independent executable files is described.

We claim:

1. A method of opening an architecture independent executable file containing a plurality of blocks of executable code for each of a plurality of Central Processing Unit (CPU) types for use with a desired CPU type of a computer system comprising the steps of:
   searching a file for an identifier header;
   attempting to load from said computer system's storage and execute in said computer system said file's contents when said identifier header is not found in said file;
   reading said identifier header when said identifier header is found in said file;
   determining said plurality of CPU types identified in said identifier header;
   comparing each of said plurality of CPU types to a desired CPU type;
   terminating the opening process when none of said plurality of CPU types are identified in said identifier header that correspond to said desired CPU type;

determining CPU sub-types identified in said identifier header when one of said plurality of CPU types identified in said identifier header corresponds to said desired CPU type;

comparing said CPU sub-types identified in said identifier header to a desired CPU sub-type;

loading from said computer system's storage and executing in said computer system a block of object code corresponding to said desired CPU sub-type when one of said CPU sub-types identified in said identifier header corresponds to said desired CPU sub-type;

loading from said computer system's storage and executing in said computer system said block of object code corresponding to said desired CPU type when one of said CPU sub-types identified in said identifier header does not correspond to said desired CPU sub-type.

2. The method of claim 1 wherein said file comprises an identifier header identifying each of said plurality of blocks of code contained in said file;
a first block of object code compiled for a first architecture type;
a second block of object code compiled for a second architecture type.

3. The method of claim 2 wherein said identifier header includes:
a first identifier identifying said file as an architecture independent file;
a second identifier identifying the number of object code blocks contained in said file;
a plurality of architecture identifiers each associated with one of said plurality of object code blocks.

4. The method of claim 3 wherein said first identifier comprises a hexadecimal word.

5. The method of claim 4 wherein each architecture identifier includes:
a CPU type identifier;
a CPU sub-type identifier;
an offset to an associated object code block;
an object code block size identifier; and,
an alignment identifier.

6. The method of claim 5 wherein said first architecture type comprises a 68K architecture type.

7. The method of claim 6 wherein said second architecture type comprises an i86 architecture type.

8. The method of claim 2 wherein said file further includes a third block of object code compiled for a third architecture type.

9. The method of claim 8 wherein said third architecture type comprises a RISC architecture type.

10. The method of claim 2 wherein said file further includes a third block of object code compiled for a sub-type of one of said first and second architecture types.

11. The method of claim 10 wherein said third block of object code comprises an i86 architecture sub-type.

* * * * *